(No Model.)
W. C. HOOKER.
ANIMAL TRAP.
No. 390,021. Patented Sept. 25, 1888.
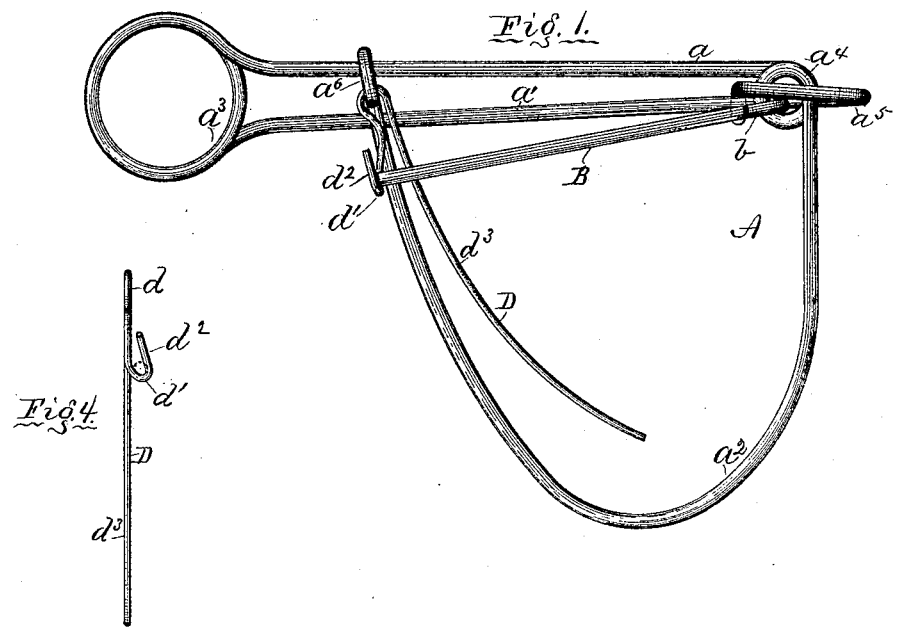
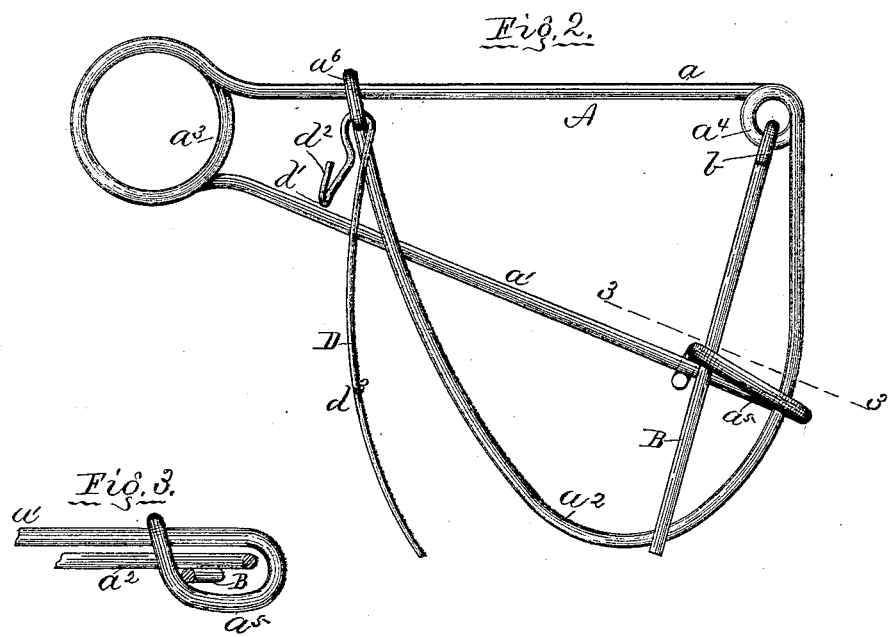
Witnesses:
S. R. Richards
P. J. Thomson
Inventor:
William C. Hooker
By W. B. Richards,
Atty.

UNITED STATES PATENT OFFICE.

WILLIAM C. HOOKER, OF ABINGDON, ILLINOIS.

ANIMAL-TRAP.

SPECIFICATION forming part of Letters Patent No. 390,021, dated September 25, 1888.

Application filed January 3, 1888. Serial No. 259,575. (No model.)

*To all whom it may concern:*

Be it known that I, WILLIAM C. HOOKER, a citizen of the United States, residing at Abingdon, in the county of Knox and State of Illinois, have invented certain new and useful Improvements in Animal-Traps, of which the following is a specification.

This invention relates to improvements in that class of animal-traps which are formed of wires bent to form the main bar, the gripping-jaws, the actuating-spring, and other parts, and which are more especially designed for catching the smaller animals—such as rats, gophers, and squirrels—by placing the trap in their runways, or at the entrance or outlet to holes into or out of which or through which they pass.

The invention, as herein shown and described, embodies certain features of construction and operation shown in Letters Patent of the United States, No. 218,532, issued to me August 12, 1879.

The main objects of this invention are to furnish improved means for holding the animal firmly and securely without barbs, which bleed it and thereby prevent other animals from entering the trap, which means consists in a gripping-jaw hinged to the main bar of the trap in such manner that the spring-actuated holding-jaw will act on it as on a cam by sliding contact to force it against the animal, and to hold it firmly after it is so forced against it; and a further object is to furnish an improved trigger consisting in a wire bent not only to form a catch, but also as a stop to limit the engagement of the parts, and thereby render the trigger more sensitive.

The further objects of the invention and in what it further consists will be hereinafter described, and then pointed out in the claims.

In the accompanying drawings, which illustrate a trap embodying my invention, Figure 1 is a side elevation showing the trap set; Fig. 2, a side elevation showing the trap sprung, as when an animal is caught therein. Fig. 3 is a sectional plan in the line 3 3 in Fig. 2, and showing the parts below said line. Fig. 4 is a perspective of the trigger C; Fig. 5, a modification.

As shown, a single wire, A, is bent to form the bar $a$, jaw $a'$, bow $a^2$, spring $a^3$, which actuates the jaw $a'$, eye $a^4$ between the bar $a$ and the bow $a^2$, eye or loop $a^5$ at the outer end of the jaw $a'$, and through which eye $a^5$ the bow $a^2$ passes, and eye $a^6$ at the end of the bow $a^2$, and through which the bar $a$ passes. This construction is substantially the same as that shown in my aforesaid patent, except the eye $a^4$, and need not be herein any further described.

If preferred, the bow $a^2$ may be hinged to the eye $a^4$, as shown at Fig. 5, where the bow $a^2$ is shown as formed of a separate piece or part from the bar $a$.

A gripping-jaw, B, formed of a straight piece of wire, is bent at its upper end to form an eye, $b$, which interlocks with the eye $a^4$ to form a hinge. The lower end of the bar B extends downward below the lower part of the bow $a^2$ and passes through the eye $a^5$.

D is the trigger, bent to form an eye, $d$, which interlocks with the eye $a^6$ to form a hinge-connection therewith, and further bent near its eye $d$ to form a catch, $d'$, from which a short portion of its end extends upwardly and close to its main portion to form a guard, $d^2$, for purposes hereinafter described. The main portion $d^3$ of the trigger D extends downwardly, as shown.

The trap is set by forcing the spring-jaw $a'$ up to the position shown at Fig. 1, and then turning the gripping-jaw B into the position shown at same figure to hold the spring-jaw in said position. The end of the gripping-jaw B is then placed in the bend or catch $d'$ against the end part, $d^2$, of the trigger, and this end part, $d^2$, is so located as to govern the extent of the overlap or engagement of the jaw B with the catch $d'$, and gage the overlap in such manner as to make the trigger as easily released from the jaw B as will suffice to hold the trap in its set position, as shown at said figure. When the trap is set, the end $d^3$ of the trigger extends downward within the bow $a^2$, but near one side thereof, as is common in this class of traps, and the trap is placed in position to catch animals, and tripped by the animal coming in contact with the arm $d^3$ of the trigger, as is also common in this class of traps. When this trap is tripped, the jaw B is forced downwardly and outwardly with a swinging movement toward the outer side or arm of the bow $a^2$ by the spring-jaw $a'$ with great force, arising, principally, from the manner in which the spring-jaw slides in contact with and acts on the jaw B as on a cam, the cam-face of which is but slightly inclined to the path or movement of the actuating part or force. This force will jam the side of the jaw B into the body of the animal at one side thereof and force the animal against the outer bar of the bow $a^2$ at its other side, and will also hold the gripping-jaw B firmly and against yielding away from the animal by reason of its struggles, or from other causes, until the spring-jaw $a'$ is raised to release it. The animal will thus be firmly held in this trap without spurs or points to enter its flesh and bleed it, and thereby cause other animals to evade the trap.

The combinations of parts shown and described herein I do not herein claim, except as combined with other parts, as recited in my claims following.

What I claim as new is—

1. In an animal-trap, in combination with a wire bent to form a bar, $a$, eye $a^4$, bow $a^2$, spring-jaw $a'$, eye $a^5$, and spring $a^3$, the gripping-jaw B, hinged to the eye $a^4$ and passed through the eye $a^5$ of the spring-jaw $a'$, whereby said spring-jaw will force the gripping-jaw B by sliding contact therewith and a cam action thereon toward the outer side or bar of the bow $a^2$, between which and the side of said gripping-jaw the animal is seized, substantially as described, and for the purpose specified.

2. In an animal-trap, in combination with a main bar, $a$, a bow, $a^2$, and a spring-actuated jaw, $a'$, a gripping-jaw, B, hinged to the bar $a$ and passed downwardly through the eye $a^5$, whereby said gripping-jaw B will by the sliding contact of the spring-jaw therewith as a cam be forced outwardly to seize the animal between its side and the outer bar of the bow $a^2$, substantially as and for the purpose specified.

3. In an animal-trap, in combination with a main bar, $a$, a bow, $a^2$, a spring-actuated jaw, $a'$, and gripping-jaw B, hinged to the bar $a$ and adapted to be actuated by the jaw $a'$, a hinged trigger, D, bent to form a catch, $d'$, and a guard, $d^2$, which limits the engagement of the bar B and renders it more sensitive, substantially as and for the purpose described.

In testimony whereof I affix my signature in presence of two witnesses.

WILLIAM C. HOOKER.

Witnesses:
   FORREST F. COOKE,
   THOS. HENRY.